Jan. 5, 1954  H. H. HANSEN  2,665,360
FLASH WELDER CONTROL

Filed March 14, 1952  3 Sheets-Sheet 1

INVENTOR
HANS H. HANSEN

BY *Francis J. Klempay*

ATTORNEY

Jan. 5, 1954      H. H. HANSEN      2,665,360
FLASH WELDER CONTROL

Filed March 14, 1952

INVENTOR
HANS H. HANSEN

BY *Francis J. Klempay*

ATTORNEY

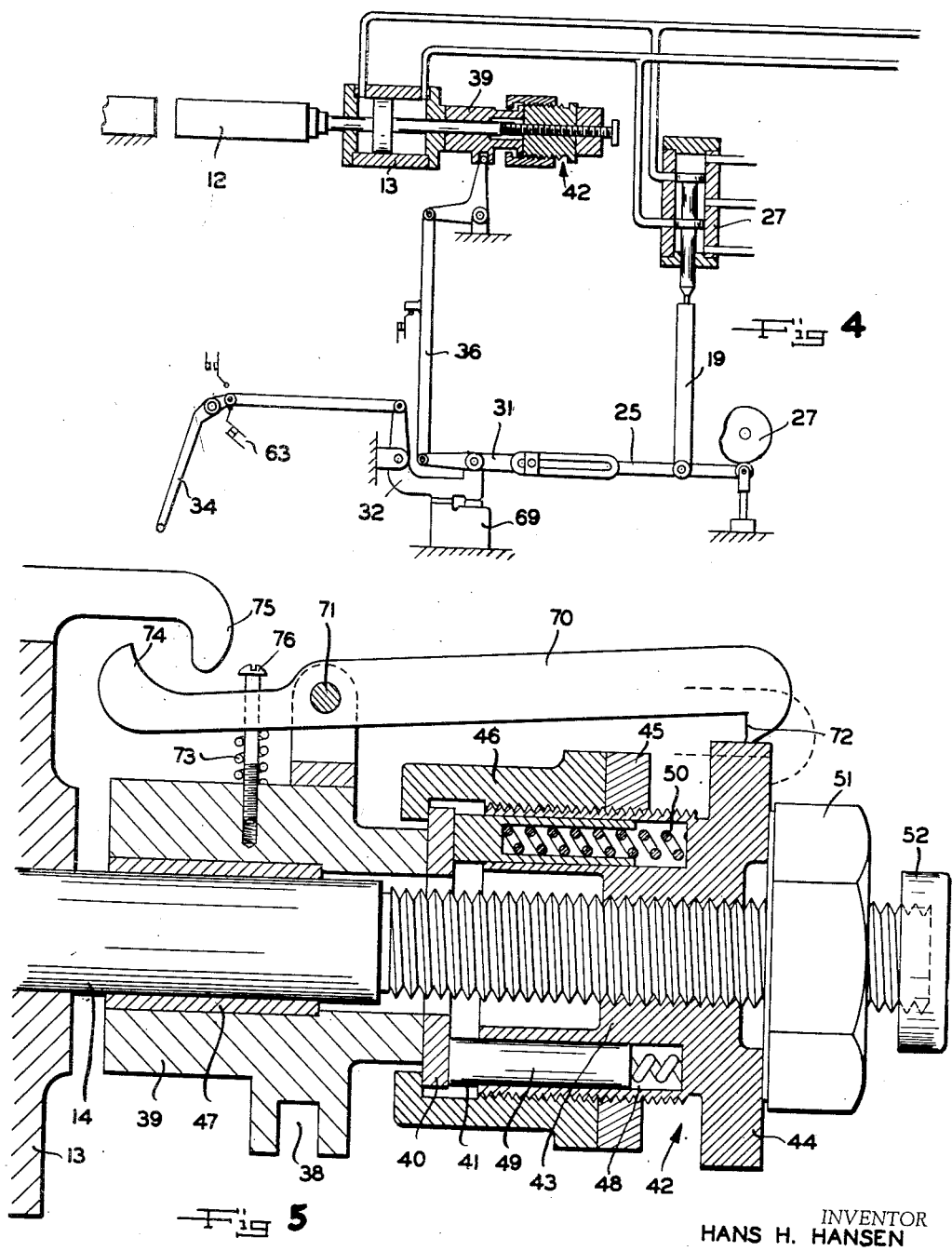

Patented Jan. 5, 1954

2,665,360

UNITED STATES PATENT OFFICE 2,665,360

FLASH WELDER CONTROL

Hans Henning Hansen, Warren, Ohio, assignor to The Taylor-Winfield Corporation, Warren, Ohio, a corporation of Ohio Application March 14, 1952, Serial No. 276,544

16 Claims. (Cl. 219—4)

This invention relates to electric resistance welding apparatus and more particularly to an improved system for controlling the movement of a movable work-holding platen in a flash-butt welding machine. The many operational and control requirements, in a practical flash-butt welder, such as the smooth uninterrupted advance of the work-holding platen during a welding cycle, control of the time-position pattern of such advance, and adjustments of the dimensions of flashing movement, upset movement, and final die opening, in scheduling the machine for particular welding operations, has always presented a difficult control problem. While a substantial number of systems have heretofore been proposed and used in so functioning welders of this type that acceptable welds are obtained on various types of work, such systems have the disadvantage that their adjustment and readjustment is a difficult and time-consuming task or are deficient in providing for beneficial variation in one or more operating characteristics when setting up a particular machine for a new job.

It is accordingly the primary object of the present invention to provide an improved control system for governing the movement of a movable work-holding platen in an electric resistance flash-butt welder which while possessing comprehensive and complete adjustability of all the operational factors which predetermine the performance of a particular machine for a particular job is nevertheless entirely practical and economical by reason of the employment of a reduced number of principal components which in themselves are of rugged and durable nature, and of the use of a minimum number of points of adjustment which are conveniently grouped for ease of manipulation by the machine operator. The adjustments provided for include the normal retracted position of the movable platen (which determines also the extent of "burn-off" of the work pieces), the time-position pattern of movement of the platen both during flashing and upsetting of the work, the dimensional extent of upset of the work, and the minimum or final distance between the fixed and movable work-holding and current-conducting dies of the machine, commonly termed "final die opening." As is well understood in this art the movable platen should advance smoothly according to a predetermined time-position pattern during the flashing phase of the welding cycle and at upset the movable platen should advance much more rapidly yet under firm control to thus join the metal to be welded.

Changes in the character of the welds to be effected or in the metal sections being welded require one or more adjustments to be made in the above detailed operational sequence of the machine and it is now within the welding machine operator's skill to specify a predetermined schedule for the particular kind of work at hand. Thus, for example, in resetting the machine a new job may require merely that the extent of "burn-off" should be increased while all other adjustments remain fixed. It is accordingly desirable that adjustment of any one factor may be effected without disturbing other pre-set factors and it is another object of the invention to provide a control system for the purpose stated in which individual adjustment of the various welding schedule factors may be quickly and easily made without realigning the entire control or other parts thereof. This characteristic is particularly advantageous as regards the control of movement of the platen during flashing wherein it is commonly desirable to accelerate the movement of the platen toward the end of the flashing period. It has heretofore been proposed to utilize a speed-control cam for this purpose and I also utilize the same in my present invention but the same is so integrated with other components of the control system that the same general optimum pattern of movement may be obtained from the same cam and control mechanism even though the average rate of advance of the movable platen is increased or decreased and/or even though a change is made in the length of flashing or "burn-off" movement of the platen. For practically all ranges of work the same cam may be employed.

A further object of the invention is the provision of improved control apparatus having the features of adjustability outlined above in which the adjustments are effective on rugged components thus eliminating any possibility of damage due to rough handling and in which the adjustments when once made will remain rigidly fixed over prolonged severe conditions of service whereby substantially improved consistency in the carrying out of the welding schedule may be obtained.

Yet another object of the invention is the provision in control apparatus having the features and advantages outlined above of arrangements whereby the cycle of movement of the platen during a welding operation may be directed either entirely automatically, entirely manually, or combined automatically and manually. Further, such cycle of movement may include accurate control over the extent or dimension of platen retraction (die opening) at the completion of the successive welding cycles and unclamping of the work in order that such initial opening may be limited as required to discharge the welded work piece from the machine. It may also include an initial quick closing of the dies under a controlled lower pressure for preheating the work pieces by the flow of current from the welding transformer preparatory to the initiation of the flashing period of the welding cycle as is desirable in some classes of work.

The above and other objects and advantages of the invention will become apparent upon consideration of the following specification and accompanying drawing wherein there is disclosed a preferred embodiment of the invention.

In the drawing:

Figure 4 shows the apparatus of Figures 2 and 3 with the parts positioned at the end of upset of the work; and Figure 5 is a detailed sectional view, on an enlarged scale, of a portion of the mechanical apparatus of the assembled control of Figure 1.

Figure 1:
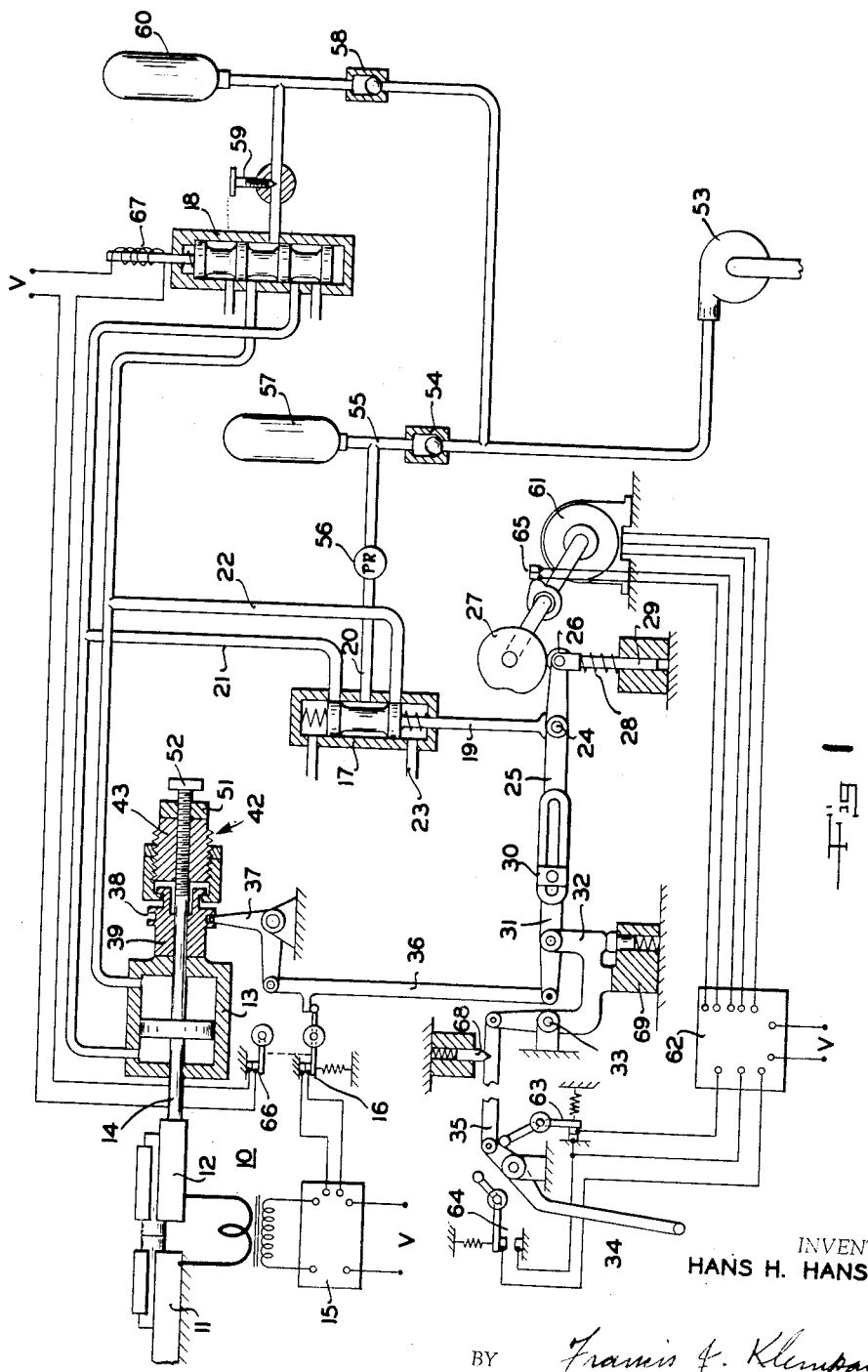
Figure 1 is a schematic representation of a flash welder control system embodying the principles of my invention with parts positioned to start the upset of the work upon completion of the flashing stage in the welding cycle.

Referring first to Figure 1, the flash welding machine proper is shown schematically as comprising a welding transformer 10 the two secondary terminals of which are connected respectively to a fixed work-holding platen 11 and a movable platen 12, the latter of which is arranged to be actuated by a double acting hydraulic cylinder 13, the piston rod 14 of which extends outwardly of either end of the cylinder. The primary winding of welding transformer 10 is energized from a suitable current source through a control panel 15 which includes, among other instrumentalities, a timer (not shown) which is operative to interrupt the flow of current a predetermined interval following the closure of a switch 16, the function of which will be explained below. The time-position pattern of movement imparted to the movable platen 12 with which the present invention is primarily concerned is determined, of course, by the flow of oil into the opposite ends of the cylinder 13 and such flow is controlled by a follow valve 17 and a dumping valve 18, the latter being utilized only during upset of the work pieces to rapidly supply a large volume of oil under high pressure to the outer end of cylinder 13 to effect a quick forward movement of the movable platen 12, all in accordance with usual practice in the art.

Follow valve 17 is preferably a sliding spool type of valve, as shown, operated by the rod 19 which in the vertical position shown is operative upon upward movement to valve oil under pressure from a source 20 through conduit 21 to the inner end of cylinder 13 while exhausting oil from the outer end of the cylinder through conduit 22 and outlet port 23. Conversely, upon downward movement of rod 19 oil is admitted to the outer end of cylinder 13 to effect an inward or advance movement of the platen 12. Through linkage now to be described the sliding movement of rod 19 is differentially controlled by either an automatic or manual factor balanced against the factor of movement of the platen 12 as sensed through the outward projecting end of the connected piston rod 14. Thus, the outer end of rod 19 is pivotally connected at 24 to an intermediate portion of a lever 25, one end of which is provided with a cam-following roller 26 maintained in contact with a cam 27 by spring 28. Spring 28 encircles the shank of a slidably mounted guide stem 29 which is pivotally connected to the lever 25 as shown. The opposite end of lever 25 is slotted longitudinally and provided with a fitting 30 which serves to pivotally connect lever 25 with a similarly slotted end portion of a second lever 31 which is pivotally mounted intermediate its ends on a carrier 32. Fitting 30 is so constructed that it may be positioned and secured at a preselected position longitudinally along the slotted ends of the levers 25 and 31 whereby the drive ratio between these levers may be varied as desired. Carrier 32 is a bellcrank type of lever pivotally carried on a fixed part of the welding machine at 33. Also pivotally carried on a fixed part of the welding machine is a hand control lever 34 which has driving connection with carrier 33 through connecting link 35. The end of lever 31 opposite the slotted end thereof is mechanically coupled by means of a link 36 with a bellcrank lever 37 which has the outer end of its driving leg received in an annular groove 38 of a driving sleeve 39.

Referring now more particularly to Figures 1 and 5 it should be noted that the sleeve 39 is mounted on the piston rod 14 of the principal platen drive cylinder 13 and has at its outer end a radially outward extending flange 40 which is received within the internal circumferential groove 41 of a nut assembly 42 which is screw threadedly received on a screw threaded outer portion of the rod 14. Nut assembly 42 is comprised of a body member 43 having both internal and external threads and an outer flange 44. Screw threaded on the external threads of the body member 43 is first a locking nut 45 and then a sleeve 46 having an internal shoulder at its inner end to form the groove 41. It should be observed that the axial length of the groove 41 is adjustable and normally greater than the axial length of the flange 40 of the drive sleeve 39 so that the drive sleeve 39 may have limited sliding movement on the rod 14 relative to the nut assembly 42 and to facilitate such sliding movement a sleeve type of bearing 47 may be interposed between the internal diameter of the sleeve 39 and a smooth portion of the projecting rod 14. To normally bias the drive sleeve 39 to extended position relative to the body member 43 of the nut assembly 42 this body member is formed intermediate its inner and outer threads with a plurality of circumferentially spaced but axially extending bores 48 to slidably receive hollow guide pins 49 the closed outer ends of which bear against the face of the flange 40. Also received within the bores 48 and partially within the pins 49 are the compression springs 50 which bias the pins 49 outwardly thereby yieldably holding the drive sleeve 39 in extended position as described.

The above described relative sliding movement between the drive sleeve 39 and the nut assembly 42 represents and controls the extent of upset movement of the movable platen of the welding machine and it should be noted that the extent or dimension of this upset movement may be readily adjusted by backing off the locking nut 45 from the sleeve 46 after which this sleeve may be rotated on the external threads of the body member 43 to vary the axial length of the internal groove 41. As will appear later, it is the absolute position of the drive sleeve 39 relative to the fixed cylinder 13 which determines the point during the pattern of movement of the platen during the welding cycle at which the dumping valve 18 is actuated to initiate the rapid upset movement.

A large lock nut 51 bears against the outer face of the flange 44 of the body member 43 of the nut assembly 42 whereby this nut assembly is rigidly locked in selected position on a threaded end portion of the piston rod 14 and at the very outer extremity of this rod there is secured a stop nut 52.

In the assembled apparatus shown hydraulic fluid pressure is furnished by a pump 53 the outlet of which is connected through check valve 54, conduit 55, pressure regulator 56 to the inlet 20 of follow valve 17, and connecting with the conduit 55 is an accumulator 57. Likewise, the outlet of pump 53 is connected to the inlet of dump valve 18 through check valve 58 and a manual regulator valve 59 and, again, an accumulator (60) is arranged in the hydraulic circuit to furnish a large volume of high pressure fluid in a short period of time as is required for effective upsetting movement of the platen in the welding machine.

Control cam 27 is arranged to be actuated by an electric motor 61 which is energized from a suitable power source through suitable relay control apparatus 62 having associated therewith an initiating switch 63, a reset switch 64, and a limit switch 65. Switch 63 is arranged to be closed upon the control lever 34 being moved far to the left, as viewed in Figure 1, while switch 64 is arranged to be closed upon lever 34 being moved far to the right as viewed in this figure. Switch 65 is synchronized with the cam 27 to be actuated upon the cam reaching its proper initial starting position at the beginning of a welding cycle, and the general control is such that at the end of any welding cycle and upon the lever being swung to momentarily close switch 64, motor 61 and cam 27 are reversed to return the cam to its proper initial starting position whereupon switch 65 acting through the relay control 62 deenergizes motor 61 thus readying the apparatus for the next succeeding cycle of operation. Upon closure of switch 63 to initiate the welding cycle motor 61 is energized in a forward direction to drive cam 27 at a proper speed through suitable gearing, not shown.

Switch 16 is arranged to be closed by link 36 upon driving sleeve 39 reaching a predetermined position—normally upon this sleeve contacting the outer face of the outer end housing of cylinder 13, and mechanically ganged with switch 16 is a switch 66 which controls the energization of a solenoid 67 for actuating the dump valve 18 whereby the dumping valve is actuated upon the sleeve 39 reaching the above specified position.

Figure 3:
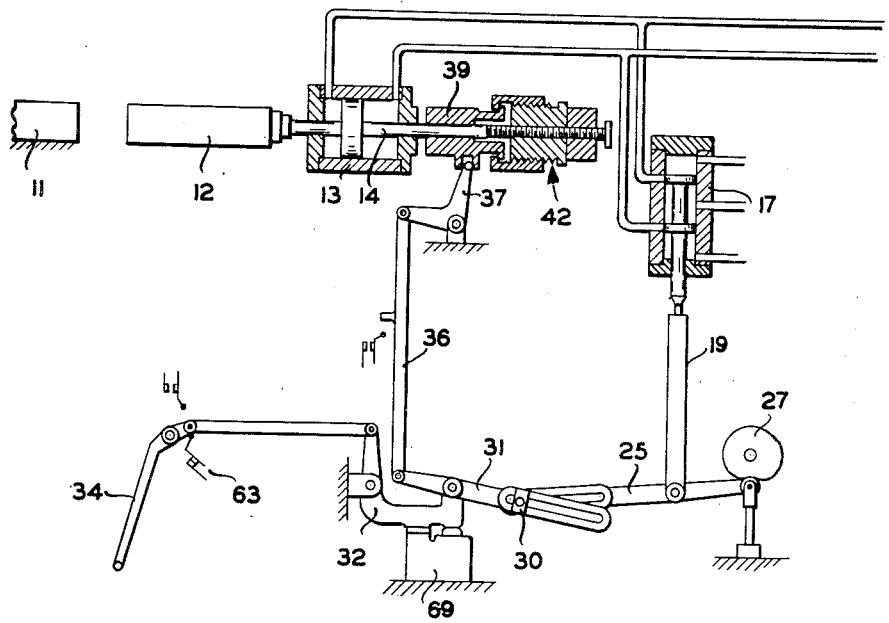
Figure 3 shows the apparatus of Figure 1 but with the parts positioned to initiate flashing of the work under automatic control.

In normal repetitive operation of the welding machine the pattern of movement of the movable platen will be automatically controlled and in such case the manual control lever 34 will remain in the position shown in Figure 1, being held in such position by a spring-pressed pawl 68 engaging a notch in link 35. When the manual control lever is so positioned and locked the carrier 32 is firmly seated on a fixed anvil 69 whereby the supporting fulcrum for the lever 31 is firmly fixed. Now by referring to Figure 3 which shows the position of the parts at the start of a welding cycle under automatic control (the closure of switch 63 having started the timed rotation of cam 27) lever 25 first begins to rock downwardly about the pivot point provided by fitting 30 and the core of follow valve 17 moves downwardly to admit fluid pressure to the outer end of cylinder 13. Such admission of fluid pressure continues until the resultant actuation and extent of movement of the rod 14 and movable platen 12 acting through lever 37, link 36 and lever 31 raises the pivot point of fitting 30 sufficiently to compensate for the downward component effected by cam 27 whereby the valve 17 is throttled, and in this manner the pattern of movement of the movable platen 12 is accurately controlled by the contour of the cam 27, particularly since cam 27 is rotated at a controlled speed. As explained above, the ratio of advantage between the levers 25 and 31 is controlled by the longitudinal position of the fitting 30 along these levers. With the fitting to the left as shown in Figure 3 slight deviation in the cam 27 will result in maximum deviation in the rod 14 and it may be said therefore that the parts in Figure 3 are adjusted for maximum "burn-off" dimension, it being understood that the operating radius of cam 27 is minimum at the start of a welding cycle. By moving the fitting 30 to the right, as viewed in Figure 3, the extent of burn-off during the flashing period may be diminished as required in the particular welding job at hand. It will become clear later that this burn-off dimension may be adjusted entirely independently of all the other settings of the complete apparatus such as the acceleration slope of the flashing movement (cam shaped), extent of upset movement, timing of upset current.

The flashing movement initiated by movement of the parts to the position shown in Figure 3 continues until the same is interrupted by the start of the rapid upset movement which is initiated upon the parts reaching the positions shown in Figure 1. Here the cam 27 has effected such closing movement of the piston rod 14 that the driving sleeve has come into contact with the cylinder 13 and the link 36 has closed switches 16 and 66. Immediately the dumping valve 18 is actuated, far outstripping the follow valve 17 and the movable platen 12 is surged forwardly to impart to the work pieces being welded the rapid advance under heavy force normally required to effect dense solid welds. However, if uncontrolled, such quick upsetting movement may well result in excessive and unnecessary deformation of the work pieces or cracking of the weld and in my apparatus I accordingly control the rate of advance of the movable platen during upset by means of the throttle valve 59 and the extent or dimension of this upsetting movement by means of the nut assembly 42, the body member 43 of which closes onto the adjacent end of the drive sleeve 39 whereby further forward movement of the rod 14 and platen 12 is absolutely prevented. As explained above, the extent of this upsetting movement may be decreased by shortening the axial length of groove 41, it being understood that the operator for switch 66 is so adjusted that the switch is closed just as the sleeve 39 contacts cylinder 13 and while the flange 40 of sleeve 39 is yet resting against the shoulder of sleeve 46. This general arrangement is further highly advantageous in that none of the linkage between lever 37 and valve rod 19, including the handle 34, is actuated or moved during the quick upsetting movement of the platen of the welding machine, thus reducing the strain and wear on these precision parts and eliminating all tendency of these parts to get out of adjustment due to the shock of the upsetting movement.

One of the adjustments mentioned above as being desirable in the operation of a flash welding machine is the so called final die dimension which is the spacing between the work held and current conducting dies on the fixed and movable platens at the completion of upset and in accordance with the teachings of my invention adjustment of the final die dimension may be readily accomplished simply by backing off the locked nut 51 and rotating the nut assembly 42 on the threaded rod 14 in either direction. If the nut assembly 42 is screwed outwardly the final die dimension is less and it should be particularly noted that the change in this dimension does not change or effect the previously set upset dimension, the extent of burn-off, or any of the other settings of the assembled control apparatus.

In actual practice a variable speed drive is interposed between the motor 61 and the cam 27 so that the cam 27 may be rotated at variable speed to change the rate of advance of the movable platen of the welding machine during flashing without effecting any of the other adjustments of the control. Normally, the rate of acceleration of the movable platen during flashing is the same for all work on any particular machine and consequently the same cam 27 may be used for widely varying jobs but, if desired, the cam 27 may be readily interchanged with other cams having different contours.

At the completion of a welding cycle the work holding clamps are first released, after which the welded work may be removed and the dies opened preparatory to receiving the next work to be welded. The dies may be opened by swinging control lever 34 far to the right, as viewed in Figure 1, whereby the levers 31 and 25 are swung far upwardly to raise the core in follow valve 17 whereby fluid pressure at large volume from the accumulator 57 is admitted to the platen end of cylinder 13 to rapidly retract platen 12. However, it is often necessary due to shape factors of the work pieces that the dies be opened only a very small controlled distance to permit removal of the work after release of the clamps and it is most desirable that the control of the dimension of this initial die retraction be effected by the master control lever 34 either by moving the same (to the right as viewed in Figure 1) to a visually determined position or against a retractible stop, not shown. By reason of the above explained independence of the upset movement control with respect to the control lever 34 no dimensional control over the opening of the dies during an initial range equal to the upset dimension can be effected by the control lever 34 in the apparatus thus far described. To overcome this problem I provide the latching arrangement shown in detail in Figure 5 wherein a latching lever 70 is pivotally mounted at 71 on the control drive sleeve 39 and has at its outer end a hook 72 which is arranged to snap over the outer end of the flange 44 of the upset nut assembly 42 when the nut and drive sleeve are collapsed at the completion of upset as explained. A coil spring 73 retains the lever 70 in latching position as a control sleeve 39 backs away from the cylinder 13 at the start of retracted movement of the platen 12. By thus locking the drive sleeve 39 and nut 42 together with the upset dimension removed from the linkage it should be understood that all of the retraction movement of the platen 12 is under the precise control of the manual lever 34 which, as explained above, may be either visually positioned or brought against a stop to accurately limit the dimension of the initial retraction of the dies preparatory to the removal of the welded work. Upon such removal, however, the dies may be retracted their full extent by further movement of the control lever 34 to the right and as their full open position is reached a cam surface 74 on the opposite end of lever 70 engages a projection 75 cantilevered on the cylinder 13 whereby the lever 70 is rotated to release the latching hook 72 and immediately the springs 50 in the nut 42 act to expand the nut 39 and spring 42 whereupon the upset dimension is reestablished in the control linkage preparatory to the next succeeding cycle of operation of the welding machine. If the function of the latch 70 is not required in the operation of the welding machine on a particular job the same may be readily removed from the control sequence simply by tightening down a screw 76 which retains the lever 70 in elevated or non-latching position.

Figure 2:
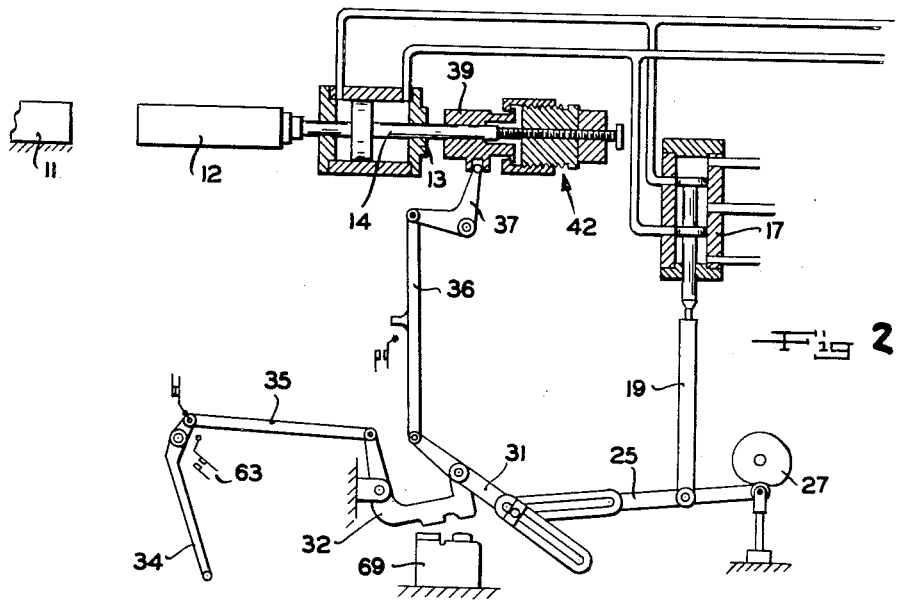
Figure 2 is a fragmentary showing of the apparatus of Figure 1, with the parts positioned to initiate flashing of the work under hand control as may sometimes be desired at the initiation of a welding cycle.

At the end of upset and completion of the weld the control parts are positioned as shown in Figure 4 and, as explained above, at this time the work clamps are released and the welded work removed and by moving the control lever 34 far to the right to fully retract the dies as explained above the control parts assume the position shown in Figure 2. This is the starting position for manual control of the movable platen during the flashing phase of the welding cycle. It should be understood, of course, that in some operations the flashing is under full automatic control in which case the work pieces are set further apart so that they just come together upon the control linkage being moved to the positions shown in Figure 3 which, as stated above, represents the start of automatic flashing. If manual control is to be used at the start of flashing (for pre-heating or for burning off of large irregularities) the work pieces are positioned closer together so that they may be manipulated into and out of engagement with each other under manual control of lever 34 within the range of movement outside the closing of switch 63. For full manual operation the energy source for motor 61 may be entirely disconnected and the cam 27 moved to and retained in a "manual" position which is such as to permit full manual control of the flash movement of platen 12 by means of lever 34 down to the point of upset which, as stated above, is reached when the drive sleeve 39 engages cylinder 13.

It should now be apparent that I have provided an improved flash welder control which accomplishes the objects initially set out above. While the apparatus of this control requires but a reduced number of component parts, as compared to flash welder controls of comparable functioning heretofore proposed, the parts are relatively simple in construction and readily adaptable to rugged design to thereby render long and dependable service even under severe conditions of industrial usage. Of substantial importance are the features that adjustments may be made in any one of a large number of operational characteristics without impairing the adjustment of the other settings, that the precision follow valve and control linkage therefor is effectively shielded from shock during the upsetting phase of the welding cycles, and that it is possible to effect an accurately controlled but limited initial opening movement of the dies to permit special work to be readily removed therefrom without danger of injury to the work or to the dies.

Having thus described my invention what I claim is new and desire to secure by Letters Patent is:

1. In an electric resistance flash-butt welder having a movable work-holding platen and a hydraulic cylinder for moving said platen the combination of a rod secured to and movable with said platen, a stationary abutment through which said rod extends, a nut screw-threadedly received on said rod on the opposite side of said abutment from said platen, a drive sleeve slidably received on said rod intermediate said abutment and said nut and interlocked with said nut to have limited axial movement with respect to said nut, yieldable means normally retaining said sleeve in outward position with respect to said nut, a follow valve for controlling the flow of fluid to said cylinder, a cam, means to move said cam at a predetermined speed, means to actuate said follow valve comprising differential linkage interconnecting said sleeve and said cam and having an intermediate member connected to said valve whereby fluid is admitted to said cylinder through said valve to effect a predetermined time-position pattern of movement in said platen as determined by the configuration and speed of movement of said cam, a second valve to supply fluid to said cylinder in a direction tending to move said platen in a forward direction at a rate greater than the follow valve, and means operative upon said sleeve reaching said abutment during advance movement of said platen to actuate said second valve whereby advance movement of said platen is continued independently of subsequent movement of said linkage and follow valve.

2. Apparatus according to claim 1 further characterized in that the means interlocking said sleeve and said nut includes means to vary the dimension of the limited relative axial movement between said sleeve and nut.

3. Apparatus according to claim 1 further characterized in that said sleeve comprises a radially outward directed flange, said nut having an internal annular groove to receive said flange, and means on said nut to vary the axial length of said groove.

4. Apparatus according to claim 1 further characterized in that said differential linkage further includes adjustable means to decrease the driving ratio between said sleeve and said follow valve while increasing the driving ratio between said cam and said follow valve and vice versa whereby the extent of movement of said platen effected by a predetermined movement of said cam during normal operation may be varied.

5. Apparatus according to claim 1 further characterized in that said differential linkage comprises a lever pivoted intermediate its ends and having one of its ends connected to said sleeve, a second lever pivoted intermediate its ends to the operator for said valve and having one of its ends in contact with said cam, and means pivotally interconnecting the other ends of said levers.

6. Apparatus according to claim 5 further including manual means for shifting the pivot point of the first mentioned lever in a direction parallel with the direction of movement of said operator whereby said operator may be moved independently of actuation of said cam and said sleeve.

7. Apparatus according to claim 6 further including means to latch said sleeve and nut together upon said sleeve reaching an inward position with respect to said nut upon completion of advance movement of said platen resulting from actuation of said second valve, and means to release said latching means upon said nut and sleeve reaching a predetermined outward position with respect to said abutment during retracted movement of said platen.

8. In an electric resistance flash-butt welder having a movable work-holding platen and a hydraulic cylinder for moving said platen as well as a rod secured to said platen and extending longitudinally of the direction of movement thereof, an abutment through which said rod extends, a nut screw-threadedly received on said rod on the opposite side of said abutment from said platen, a drive sleeve slidably received on said rod intermediate said abutment and said nut and interlocked with said nut to have limited axial movement with respect thereto, yieldable means normally retaining said sleeve in outward position with respect to said nut, a valve for controlling the flow of fluid to said cylinder, and linkage means interconnecting said sleeve and valve for actuating the latter in accordance with longitudinal movement of the sleeve.

9. Apparatus according to claim 8 further including means independent of said valve to admit fluid pressure to said cylinder whereby forward movement of said platen and rod may be continued after stoppage of movement of said sleeve by said abutment, means to latch said sleeve and nut together when in closed position during such continued movement of said platen and rod, and means to release said latching means during outward travel of said sleeve and nut away from said abutment upon retraction of said platen.

10. Apparatus according to claim 9 further characterized in that said means to latch comprises a lever pivotally mounted intermediate its ends on said sleeve and extending longitudinally of said sleeve and nut and having a hook-like end portion adapted to be received over an external shoulder on said nut upon said nut and sleeve reaching relatively closed positions, means biasing said lever to latching position, a cam on the opposite end of said lever, and a fixed cam actuator mounted on said abutment and adapted to tilt said lever to unlatching position upon outward movement of said sleeve and nut away from said abutment.

11. In a hydraulic control system for an electric resistance flash-butt welder having a movable platen and a hydraulic cylinder connected thereto for moving the platen as well as a valve for controlling the flow of hydraulic fluid under pressure to said cylinder to advance said platen through an initial flashing range of movement and a second valve to furnish fluid to said cylinder to advance said platen through a further or upset range of movement, differential mechanical linkage for actuating said first mentioned valve, means for actuating said linkage comprising a drive member, yieldable means interconnecting said platen and said drive member whereby said drive member may move forwardly along with said platen over said first range of movement, and stop means to interrupt movement of said drive member during movement of said platen through its said further range of movement.

12. Apparatus according to claim 11 further including a cam having operative driving relation with said differential linkage, and means to move said cam at a predetermined speed whereby said first valve is controlled to effect a predetermined time-position pattern of movement to said platen during said first range of movement.

13. Apparatus according to claim 12 further including a manual control member also connected to said differential linkage whereby movement of said platen may be effected independently of movement of said cam.

14. In an electric resistance flash-butt welder having a movable work-holding platen and a hydraulic cylinder for moving said platen the combination of a rod secured to and movable with said platen, a stationary abutment through which said rod extends, a nut screw-threadedly received on said rod and adapted to engage said abutment to limit the forward advance of said platen, a follow valve for controlling the flow of fluid to said cylinder, a cam, means to move said cam at a predetermined speed, said valve having a movable core, and differential linkage interconnecting said nut and said cam having a member connected with said core whereby fluid is admitted to said cylinder through said valve to effect a predetermined time-position pattern of movement in said platen as determined by the configuration and speed of movement of said cam.

15. In electric resistance flash-butt welding apparatus having a movable platen and a hydraulic cylinder to move said platen the combination of a follow valve to control the flow of fluid to said cylinder, a cam, means to move said cam at a predetermined speed, and differential linkage interconnecting said movable platen and said cam and having a member connected to the movable member of said valve for operating said valve whereby said platen may move according to a predetermined time-position pattern of movement as determined by the contour and speed of movement of said cam.

16. In electric resistance flash-butt welding apparatus having a movable platen and a hydraulic cylinder for moving said platen the combination of a follow valve for controlling the flow of fluid into said cylinder, a cam and means to move the same at a predetermined speed, differential linkage means interconnecting said platen and said cam with an operating member of said valve and operative to control the latter in such manner that said platen moves with a time-position pattern as predetermined by the contour and speed of movement of said cam, said linkage means comprising a lever having an extending free end movable in proportion to the movement of said platen and a second lever of the second class having one end pivotally connected to the said free end of said first lever at an adjustable position longitudinally thereon and having its other end engaging said cam, said member being pivotally connected to said second class lever intermediate its ends.

HANS HENNING HANSEN.

References Cited in the file of this patent

UNITED STATES PATENTS

| Number | Name | Date |
|---|---|---|
| 1,892,208 | Ferris | Dec. 27, 1932 |
| 2,373,226 | Coates | Apr. 10, 1945 |